(12) United States Patent
Ha et al.

(10) Patent No.: US 7,503,560 B2
(45) Date of Patent: Mar. 17, 2009

(54) SCANNER AND IMAGE FORMING APPARATUS HAVING THE SAME

(75) Inventors: Dong-woo Ha, Suwon-si (KR); Sung-wook Kang, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 394 days.

(21) Appl. No.: 11/397,553

(22) Filed: Apr. 5, 2006

(65) Prior Publication Data

US 2006/0274383 A1 Dec. 7, 2006

(30) Foreign Application Priority Data

Jun. 1, 2005 (KR) .................. 10-2005-0046739

(51) Int. Cl.
*B65H 31/08* (2006.01)
(52) U.S. Cl. .................................. 271/212; 271/186
(58) Field of Classification Search .............. 271/184, 271/186, 212
See application file for complete search history.

(56) References Cited

U.S. PATENT DOCUMENTS

| | | | | |
|---|---|---|---|---|
| 5,265,864 A | * | 11/1993 | Roux et al. | 271/186 |
| 5,634,637 A | * | 6/1997 | Tanaka | 271/275 |
| 5,791,645 A | * | 8/1998 | Takada | 271/3.03 |

FOREIGN PATENT DOCUMENTS

| | | |
|---|---|---|
| CN | 1517806 A | 8/2004 |
| JP | 62-157148 | 7/1987 |
| JP | 04-116026 | 4/1992 |
| JP | 05-116780 | 5/1993 |
| KR | 0173894 | 11/1998 |

OTHER PUBLICATIONS

Chinese Office Action dated Dec. 7, 2007 issued in CN 2006100923445.

* cited by examiner

*Primary Examiner*—Kaitlin S Joerger
(74) *Attorney, Agent, or Firm*—Stanzione & Kim, LLP

(57) ABSTRACT

A scanner includes a document feed plate on which one or more documents to be read are stacked, an image sensor disposed adjacent to the document feed plate to read a lower surface of the one or more documents, a plurality of document output rollers arranged vertically adjacent to each other to change a direction along which the read one or more documents proceed along a reverse C-shaped path and to output the read one or more documents through a document outlet, and a document output plate located above the document feed plate on which the output one or more documents are stacked. The plurality of document output rollers rotate in the same direction, and each of the document output rollers has a shaft that is a rotational center and a plurality of roller bodies arranged to be separated from one another along a lengthwise direction of the shaft. Additionally, the roller bodies of a first document output roller are arranged not to contact the roller bodies of a second document output roller that is adjacent to the first document output roller, and a distance between the shafts of the first and second document output rollers is less than a sum of a radius of the roller bodies of the first document output roller and a radius of the roller bodies of the second document output roller.

31 Claims, 4 Drawing Sheets

SCANNER AND IMAGE FORMING APPARATUS HAVING THE SAME

CROSS-REFERENCE TO RELATED APPLICATIONS

This application claims the benefit of Korean Patent Application No. 2005-46739, filed on Jun. 1, 2005, in the Korean Intellectual Property Office, the disclosure of which is incorporated herein in its entirety by reference.

BACKGROUND OF THE INVENTION

1. Field of the Invention

The present general inventive concept relates to a scanner that reads an image recorded on a document, and to an image forming apparatus having the scanner.

2. Description of the Related Art

FIG. 1 is a perspective view illustrating a conventional image forming apparatus 10. The conventional image forming apparatus 10 may be a multifunctional printer which works as both a printer for printing an image recorded on a sheet of paper and a scanner for reading an image recorded on a document. The conventional image forming apparatus 10 includes a scanner 20 for performing an image reading function and a printer 30 for performing a print function. The scanner 20 is provided on a top side of the conventional image forming apparatus 10, and the printer 30 is provided under the scanner 20. The printer 30 includes an input tray 22 where sheets of paper may be loaded for use during the print function, and an output tray 25 where sheets of paper having printed images are output from the printer 30. The scanner 20 includes a document feeding plate 12 where documents to be read by the scanner 20 are stacked for auto document feed (ADF), a document output plate 14 where the read (i.e., scanned) documents are stacked, and a plurality of rollers (not shown) that transfer the documents along a predetermined transfer path from the document feed plate 12 to the document output plate 14.

The document feed plate 12, the document output plate 14, and the rollers are provided on a flatbed 11. The flatbed 11 is capable of opening and closing and is installed on an upper side of the image forming apparatus 10. Thus, a size and thickness of the flatbed 11 increase so that it is difficult to make the image forming apparatus 10 compact. Also, due to the large size and heavy weight of the flatbed 11, it may be difficult for a weak person to operate the image forming apparatus 10 and the cost for transferring increases.

SUMMARY OF THE INVENTION

The present general inventive concept provides a slim scanner and an image forming apparatus having the slim scanner.

The present general inventive concept also provides a scanner in which one or more documents stacked on a document feed plate are sequentially transferred from a bottom of the stack along a reverse C-shaped path when an image recorded on the one or more documents are scanned and a subsequently output document is output to pass underneath a previously output document on the document output plate, and an image forming apparatus having the same.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a scanner comprising a document feed plate on which one or more documents to be read are stacked, an image sensor disposed adjacent to the document feed plate to read a lower surface of the one or more documents, a plurality of document output rollers arranged vertically adjacent to each other to change a direction along which the one or more read documents proceed along a reverse C-shaped path and to output the read one or more documents through a document outlet, and a document output plate located above the document feed plate on which the output one or more documents are stacked. The plurality of document output rollers may rotate in the same direction, and each of the document output rollers may have a shaft that is a rotational center and a plurality of roller bodies arranged to be separated from one another along a lengthwise direction of the shaft. Additionally, the roller bodies of a first document output roller may be arranged not to contact the roller bodies of a second document output roller that is adjacent to the first document output roller, and a distance between the shafts of the first and second document output rollers may be less than a sum of a radius of the roller bodies of the first document output roller and a radius of the roller bodies of the second document output roller.

The foregoing and/or other aspects of the present general inventive concept are also achieved by providing an image forming apparatus including a printer to print an image on one or more sheets of paper, and the scanner (described above) to read an image recorded on the one or more documents.

The plurality of document output rollers may comprise two document output rollers that are vertically close to each other.

A drive gear to receive a driving force may be provided at one side of each of the document output rollers, and a gear may be interposed between the drive gears disposed on each of the document output rollers that are adjacent to one another.

The scanner may further comprise an external guide provided adjacent to the plurality of document output rollers to guide the change of the direction and along which the read one or more documents proceed.

The scanner may further comprise a pinch roller contacting an uppermost one of the plurality of document output rollers to guide the read one or more documents to be output in a direction that is inclined downwardly.

Outer circumferential surfaces of the roller bodies (described above) may be formed of a rubber material to provide a frictional force.

The document output plate may comprise a document support surface to support the output one or more documents, and a sunken surface located between the document outlet and the document support surface and rising at an angle from a position that is lower than the document outlet to the document support surface. A horizontal length of the sunken surface may be determined such that a tailing end of a first document that is output first to the document support surface is positioned higher than the document outlet so that a leading end of a second document that is subsequently output passes underneath the trailing end of the first document.

The horizontal length of the sunken surface may be less than or equal to ¼ of a length of the one or more documents.

The document output plate may further comprise a stopper provided at an end portion of the document support surface to prevent falling of the output one or more documents.

The scanner may further comprise an ADF roller located lower than a height of the document feed plate, and a friction pad located between the document output plate and the document feed plate and facing the ADF roller to supply the one or more documents stacked on the document feed plate sheet by sheet toward the image sensor.

The scanner may further comprise a pickup roller located lower than the height of the document feed plate, and a tension sheet located between the document feed plate and the document output plate to face the pickup roller, to pickup the one or more documents stacked on the document feed plate, and to supply the one or more documents to the ADF roller.

The foregoing and/or other aspects of the present general inventive concept are also achieved by providing a scanner usable in a multifunctional image forming apparatus, the scanner comprising a document feed plate at which one or more documents to be scanned are input, a document output plate disposed above the document feed plate to which the one or more scanned documents are output, and one or more rollers to transfer the one or more documents to be scanned along a scan path from the document feed plate to the document output plate.

The foregoing and/or other aspects of the present general inventive concept are also achieved by providing a scanner usable with a multifunctional image forming apparatus, the scanner comprising a document outlet, and a document output plate having a non-planar shape. The document output plate includes a distal portion at which leading ends of one or more scanned documents are supported, a proximal portion disposed at a position that is lower than the distal portion and is adjacent to the document outlet, and an inclined portion disposed between the distal and proximal portions such that a trailing end of the one or more scanned documents projects from the distal portion and is suspended above the inclined and proximal portions.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
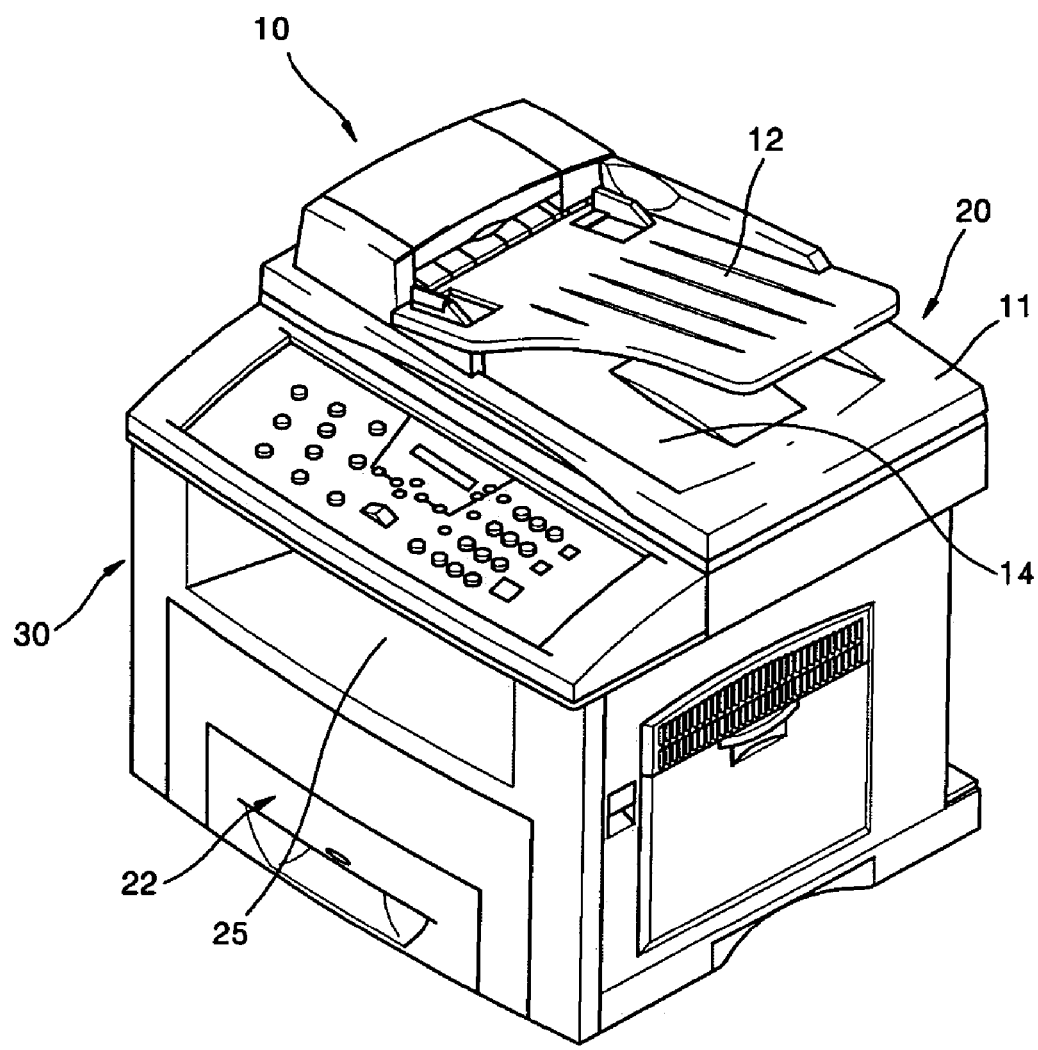
FIG. 1 is a perspective view of the conventional image forming apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
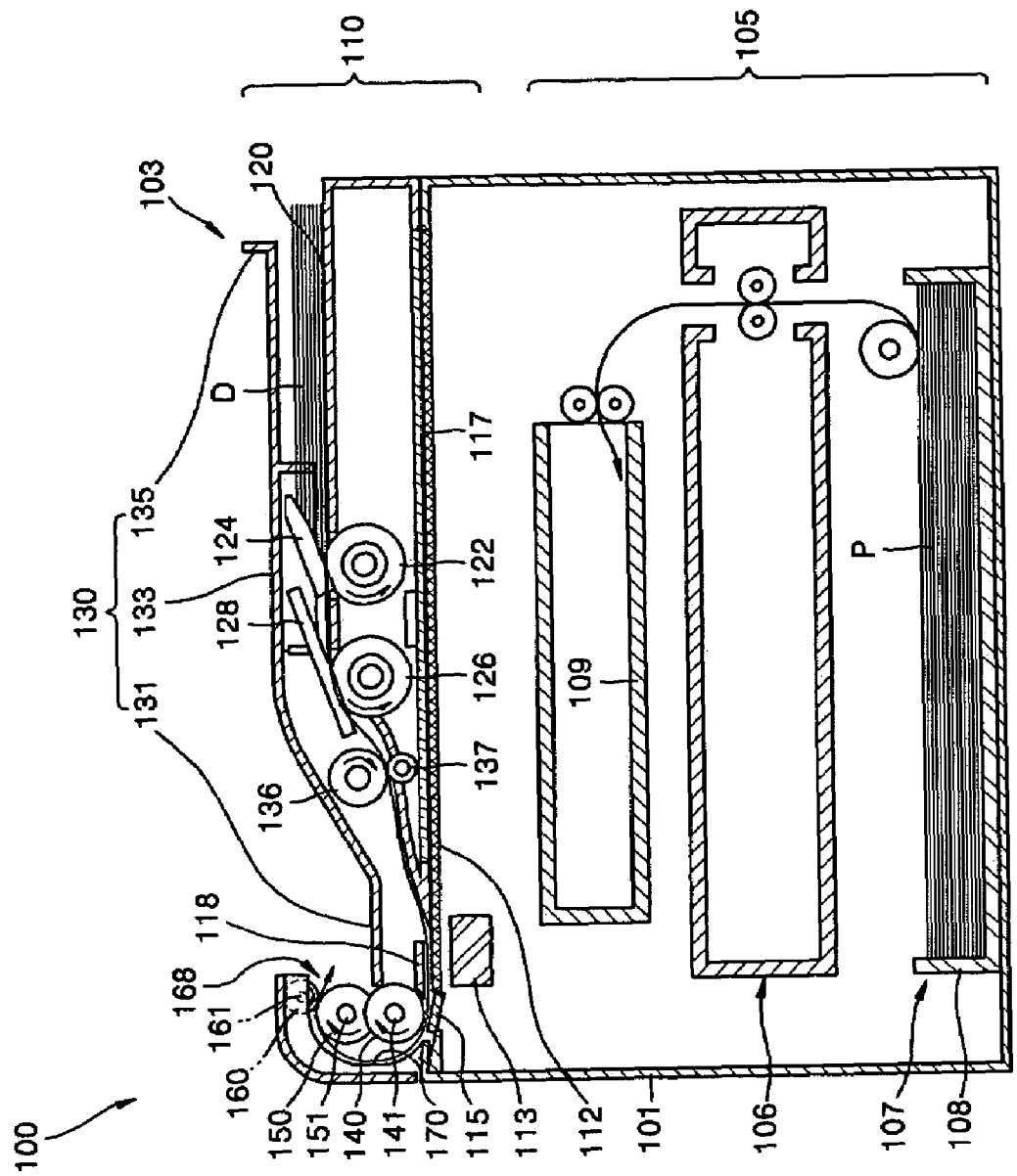
FIG. 2 is a cross-sectional view of an image forming apparatus according to an embodiment of the present general inventive concept.
Figure 3:
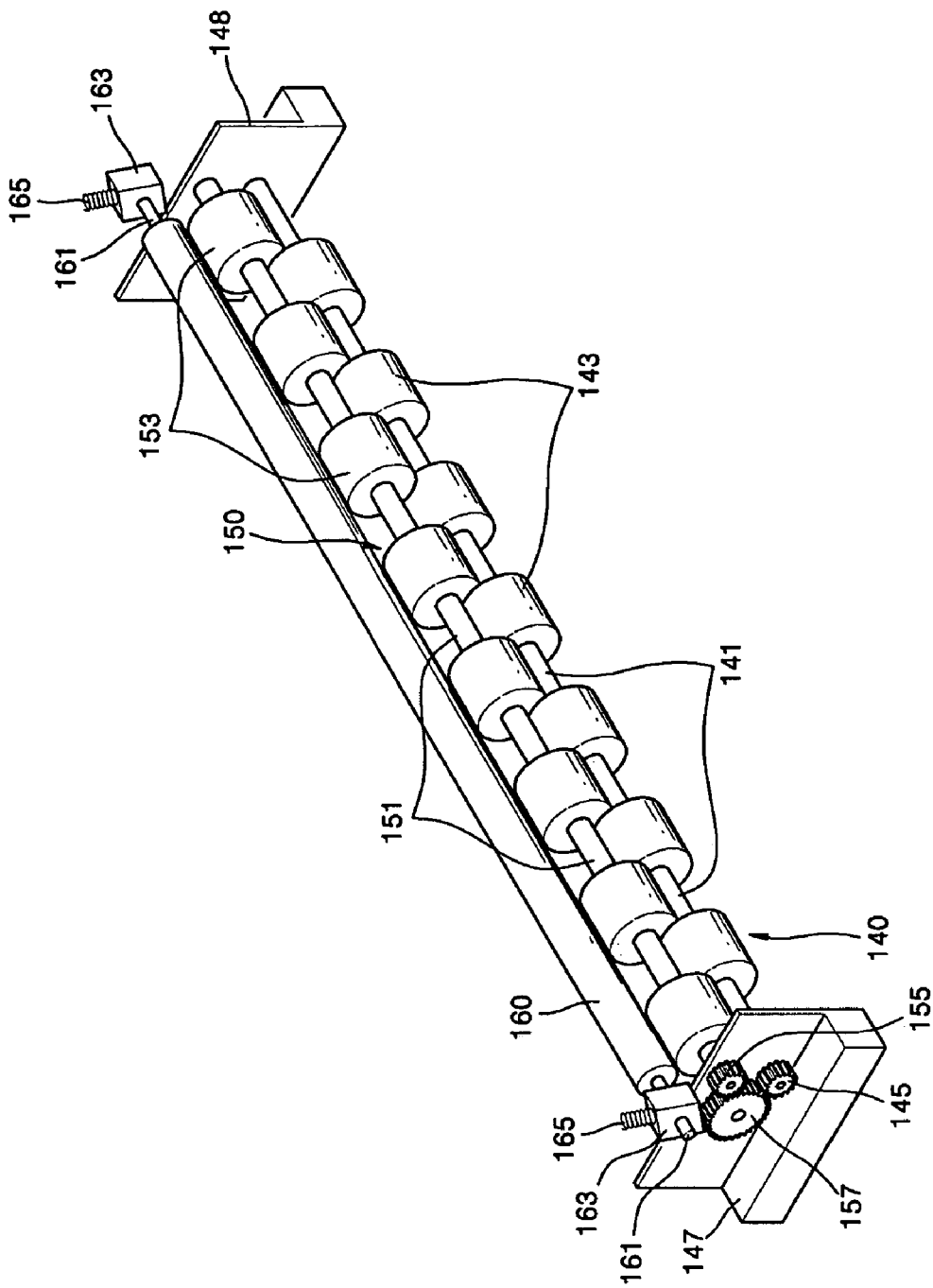
FIG. 3 is a perspective view of the document output roller shown in FIG. 2.
Figure 4:
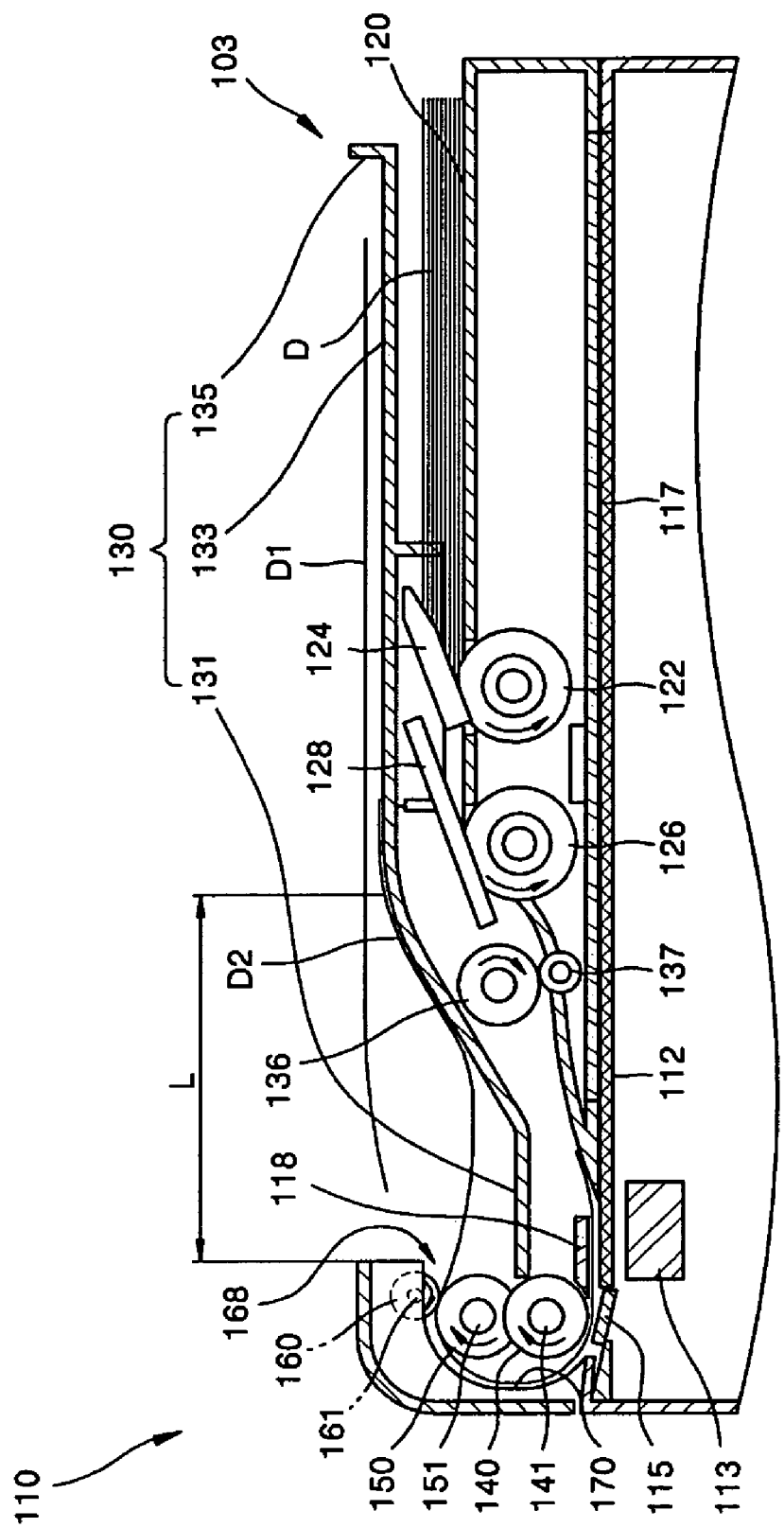
FIG. 4 is a cross-sectional view of a scanner according to an embodiment of the present general inventive concept in which documents are continuously output.

FIG. 2 is a cross-sectional view illustrating an image forming apparatus 100 according to an embodiment of the present general inventive concept. FIG. 3 is a perspective view of document output rollers 140 and 150 of the image forming apparatus 100 of FIG. 2. FIG. 4 is a cross-sectional view illustrating a scanner 110 of the image forming apparatus 100 of FIG. 2 according to an embodiment of the present general inventive concept in which documents can be continuously output.

Referring to FIGS. 2 and 3, the image forming apparatus 100 includes a case 101 and a flatbed 103 installed at an upper portion of the case 101 that is capable of sliding in and out of the case 101. A printer 105 to print an image on a paper P (or other print medium) is provided at a lower portion of the image forming apparatus 100. The printer 105 includes a paper feed unit 107 including a paper feed cassette 108, a printing unit 106 to print the image on the paper P supplied by the paper feed cassette 108, and a paper output plate 109 on which the paper P with the image printed thereon is output and stacked. The printing unit 106 may form an image using an electrophotographic method or an inkjet method.

A scanner 110 to read an image recorded on one or more documents D is provided at an upper portion of the image forming apparatus 100. The scanner 110 includes a document feed plate 120 where the one or more documents D to be read are stacked, an image sensor 113 to read a bottom surface of the one or more documents D, first and second document output rollers 140 and 150 to output the one or more documents D having the bottom surface which has been read by the image sensor 113 through a document outlet 168 by changing a direction in which the one or more documents D proceed along a reverse C-shaped path, and a document output plate 130 where the one or more documents D that are output through the document outlet 168 are stacked.

The image sensor 113 is provided under a transparent window 112 on an upper surface of the case 101 to be capable of horizontally moving. A contact image sensor (CIS) or a charge coupled device (CCD) can be used as the image sensor 113. When a user places a document one by one on the transparent window 112 for scanning (i.e., a manual scan) the image sensor 113 moves horizontally under the transparent window 112 and scans a light beam toward the document D that is placed on the transparent window 112 to read an image recorded on the bottom surface of the document D. When a plurality of documents D are placed on the document feed plate 120 and the documents D are automatically supplied (i.e., an automatic scan) the image sensor 113 is stopped at one side of the transparent window 112 and scans the light beam toward the documents D to read the image recorded on the bottom surface of the documents D while the documents D are transferred along the transparent window 112.

First and second whiteboards 117 and 118 are provided on a lower surface of the flatbed 103 to face the transparent window 112. When the flatbed 103 is closed to cover an upper surface of the case 101, the first whiteboard 117 covers a movement range of the image sensor 113 during the manual scan while the second whiteboard 118 covers the image sensor 113 that is stopped for the automatic scan. The first and second whiteboards 117 and 118 prevent the light beam that is scanned by the image sensor 113 toward the documents D from being scattered outside of the image forming apparatus 100 and reflects the light beam back to the image sensor 113 so that a high quality scan image can be obtained.

The scanner 110 includes an automatic document feed (ADF) roller 126 and a friction pad 128 facing the ADF roller 126 to supply the documents D stacked on the document feed plate 120 one by one toward the image sensor 113. The ADF roller 126 is located between the document feed plate 120 and the first whiteboard 117 to be lower than a height of the document feed plate 120. The friction pad 128 is located between the document feed plate 120 and the document output plate 130. When the ADF roller 126 rotates, the documents D stacked on the document feed plate 120 are supplied one by one to the image sensor 113 beginning with a lowermost document D.

Also, the scanner 110 includes a pickup roller 122 to pick up the documents D that are stacked on the document feed plate 120 to supply the documents D to the ADF roller 126, and a tension sheet 124 that faces the pickup roller 122. Like the ADF roller 126, the pickup roller 122 is located between the document feed plate 120 and the first whiteboard 117. Like the friction pad 128, the tension sheet 124 is located between the document feed plate 120 and the document output plate 130. The tension sheet 124 presses the documents D that are stacked on the document feed plate 120 toward the pickup roller 122 so as to contact an outer circumferential surface of the pickup roller 122. A frictional coefficient of the tension sheet 124 is lower than that of the friction pad 128.

The documents D are separated sheet by sheet by the ADF roller 126, are aligned by first and second feed rollers 136 and 137, and are supplied to the image sensor 113 in a downwardly inclined direction. The supplied documents D pass between the second white board 118 and the image sensor 113, and an image recorded on the bottom surface of the documents D is read.

The first and second document output rollers 140 and 150 are arranged vertically close to each other. As illustrated in FIGS. 2 and 3, the first and second document output rollers 140 and 150, respectively, include shafts 141 and 151 having both end portions that are rotatably supported by frames 147 and 148 in the flatbed 103 and a plurality of roller bodies 143 and 153 arranged along a lengthwise direction of the shafts 141 and 151 to be separated from each other. Referring to FIG. 3, a distance between the shaft 141 of the first document output roller 140 and the shaft 151 of the second document output roller 150 is less than a sum of a radius of one of the roller bodies 143 of the first document output roller 140 and a radius of one of the roller bodies 153 of the second document output roller 150. However, as illustrated in FIG. 3, the roller bodies 143 of the first document output roller 140 and the roller bodies 153 of the second document output roller 150 are alternately arranged so as not to contact each other.

A first drive gear 145 and a second drive gear 155 are provided at the same sides (i.e., the side of the frame 147) of the first and second document output rollers 140 and 150. A gear 157 is rotatably installed on the frame 147 between the first and second drive gears 145 and 155. Thus, when the driving power of a motor (not shown) is transferred to any of the gears 145, 155, and 157, the first and second drive gears 145 and 155 rotate in the same direction, that is, the clockwise direction in FIG. 2. Referring to FIGS. 2 and 3, an external guide 170 to guide a conversion of direction (i.e., a change in a transfer direction) of the documents D that have been read is provided outside the first and second document output rollers 140 and 150.

The first and second document output rollers 140 and 150 must have a capacity to provide a large amount of a transfer force to the documents D such that a rapid directional turn of the documents D is possible. Thus, outer circumferential surfaces of the roller bodies 143 and 153 of the first and second document output rollers 140 and 150 may be made of rubber to provide a frictional force against the documents D. Also, the upper surface of the case 101 includes a tension guide 115 facing the first document output roller 140 to press the documents D having an image that has been read toward the first document output roller 140 such that the documents D can contact an outer circumferential surface of the first document output roller 140.

The second document output roller 150 contacts a pinch roller 160. The documents D that are transferred along the external guide 170 by the first and second document output rollers 140 and 150 are output onto the document output plate 130 through the document outlet 168 between the second document output roller 150 and the pinch roller 160. As illustrated in FIGS. 2 and 3, the pinch roller 160 has a shaft 161 and both end portions of the shaft 161 are rotatably supported by a bush 163. The bush 163 is elastically pressed by a spring 165 such that the pinch roller 160 closely contacts the second document output roller 150. As illustrated in FIG. 2, the shaft 161 of the pinch roller 160 is located closer to the document output plate 130 than the shafts 141 and 151 of the first and second document output rollers 140 and 150. Accordingly, the documents D output through the document outlet 168 are guided to proceed downward at an angle.

The document output plate 130 includes a document support surface 133 located above the document feed plate 120 and a sunken surface 131 located closer to the document outlet 168 than the document support surface 133 and rising at an angle from a lower position thereof adjacent to the first and second document output rollers 140 and 150 to be connected to the document support surface 133.

Referring to FIG. 4, a horizontal length L of the sunken surface 131 is determined such that a trailing end of a first document D1 that is output first and supported on the document support surface 133 is positioned higher than the document outlet 168 so that a leading end of a second document D2 that is subsequently output (e.g., output second) can be transferred beneath the trailing end of the first document D1. In the present embodiment, the horizontal length L of the sunken surface 131 may be less than or equal to ¼ of a length of the document D. In this case, a large portion of the first document D1 is supported on the document support surface 133 so that the trailing end thereof is separated from the sunken surface 131. Thus, the leading end of the second document D2 can easily penetrate below the first document D1. Since a document type that is generally used with scanners and/or printers (e.g., a B5, A4, or letter size) has a length of 250-300 mm, the horizontal length L of the sunken surface 131 can be less than about 65 mm.

The first document D1 tends to slightly move toward an end portion of the document output plate 130 by being pushed by the second document D2. A stopper 135 is provided at the end portion of the document support surface 133 to prevent the first and second documents D1 and D2 from falling from the document output plate 130.

In the operation of the above image forming apparatus 100 described above, when the documents D are stacked on the document feed plate 120 and a document read command is input, the documents D are picked up by the pickup roller 122 so that the documents D are sequentially supplied beginning with a lowermost sheet of the documents D stacked on the document feed plate 120 between the ADF roller 126 and the friction pad 128 sheet by sheet. The documents D pass between the first and second feed rollers 136 and 137 and the lower surface of the documents D are read by the image sensor 113. The documents D are then output through the document outlet 168 as the lower surface of the documents D that is read is turned to be an upper surface by the first and second document output rollers 140 and 150 by transferring the documents D along the external guide 170. The second document D2 penetrates below the first document D1 so as to be stacked under the first document D1.

As described above, in a scanner according to the various embodiments of the present general inventive concept, a plurality of document output rollers capable of turning a direction in which a document proceeds are provided so that a thickness of the scanner is reduced compared to a conventional scanner of the prior art. Also, since a width of the plurality of document output rollers is reduced compared to when a single document output roller having the same height as that of the plurality of document output rollers is used, a width of the scanner can be narrow. Furthermore, a surface of a first document that is read (i.e., scanned) faces upward and subsequently scanned document(s) are stacked under the first document. Accordingly, orders of the documents that are input and the documents that are output remain the same.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A scanner, comprising:
   a document feed plate on which one or more documents to be read are stacked;
   an image sensor disposed adjacent to the document feed plate to read a lower surface of the one or more documents;
   a plurality of document output rollers arranged vertically adjacent to each other to change a direction along which the read one or more documents proceed along a reverse C-shaped path and to output the read one or more documents through a document outlet; and
   a document output plate located above the document feed plate on which the output one or more documents are stacked, wherein the document output plate comprises:
      a document support surface to support the output one or more documents; and
      a sunken surface located between the document outlet and the document support surface and rising at an angle from a position that is lower than the document outlet to the document support surface,
      wherein a horizontal length of the sunken surface is determined such that a trailing end of a first document that is output first to the document support surface is positioned higher than the document outlet so that a leading end of a second document that is subsequently output passes underneath the trailing end of the first document.

2. The scanner as claimed in claim 1, wherein the plurality of document output rollers rotate in the same direction, and each of the document output rollers has a shaft that is a rotational center and a plurality of roller bodies arranged to be separated from one another along a lengthwise direction of the shaft.

3. The scanner as claimed in claim 2, wherein the roller bodies of a first document output roller are arranged not to contact the roller bodies of a second document output roller that is adjacent to the first document output roller, and a distance between the shafts of the first and second document output rollers is less than a sum of a radius of the roller bodies of the first document output roller and a radius of the roller bodies of the second document output roller.

4. The scanner as claimed in claim 2, wherein outer circumferential surfaces of the roller bodies are formed of a rubber material to provide a frictional force.

5. The scanner as claimed in claim 1, wherein the plurality of document output rollers comprise two document output rollers that are vertically close to each other.

6. The scanner as claimed in claim 1, wherein a drive gear to receive a driving force is provided at one side of each of the document output rollers, and a gear is interposed between the drive gears disposed on each of the document output rollers that are adjacent to one another.

7. The scanner as claimed in claim 1, further comprising:
   an external guide provided adjacent to the plurality of document output rollers to guide the change of the direction and along which the read one or more documents proceed.

8. The scanner as claimed in claim 1, further comprising:
   a pinch roller contacting an uppermost one of the plurality of document output rollers to guide the read one or more documents to be output in a direction that is inclined downwardly.

9. The scanner as claimed in claim 1, wherein the horizontal length of the sunken surface is less than or equal to ¼ of a length of the output one or more documents.

10. The scanner as claimed in claim 1, wherein the document output plate further comprises:
    a stopper provided at an end portion of the document support surface to prevent falling of the output one or more documents from the document support surface.

11. The scanner as claimed in claim 1, further comprising:
    an ADF roller located lower than a height of the document feed plate; and
    a friction pad located between the document output plate and the document feed plate and facing the ADF roller to supply the one or more documents stacked on the document feed plate sheet by sheet toward the image sensor.

12. The scanner as claimed in claim 11, further comprising:
    a pickup roller located lower than the height of the document feed plate; and
    a tension sheet located between the document feed plate and the document output plate to face the pickup roller, to pickup the one or more documents stacked on the document feed plate, and to supply the one or more documents to the ADF roller.

13. An image forming apparatus, comprising:
    a printer to print an image on one or more sheets of paper; and
    a scanner to read an image recorded on one or more documents, the scanner comprising:
    a document feed plate on which the one or more documents to be read are stacked,
    an image sensor to read a lower surface of the one or more documents,
    a plurality of document output rollers arranged vertically adjacent to each other to change a direction along which the read one or more documents proceed along a reverse C-shaped path and to output the read one or more documents through a document outlet, and
    a document output plate located above the document feed plate on which the
    output one or more documents document are stacked, wherein the document output plate comprises:
       a document support surface to support the one or more documents; and
    a sunken surface located between the document outlet and the document support surface and rising at an angle from a position that is lower than the document outlet to the document support surface, wherein a horizontal length of the sunken surface is determined such that a trailing end of a first document that is output first to the document support surface is positioned higher than the document outlet so that a leading end of a second document that is subsequently outlet passes underneath the trailing end of the first document.

14. The image forming apparatus as claimed in claim 13, wherein the plurality of document output rollers rotate in the same direction, and each of the document output rollers has a shaft that is a rotational center and a plurality of roller bodies arranged to be separated from one another along a lengthwise direction of the shaft.

15. The image forming apparatus as claimed in claim 14, wherein the roller bodies of a first document output roller are arranged not to contact the roller bodies of a second document output roller that is adjacent to the first document output roller, and a distance between the shafts of the first and second document output rollers is less than a sum of a radius of the roller bodies of the first document output roller and a radius of the roller bodies of the second document output roller.

16. The image forming apparatus as claimed in claim 14, wherein outer circumferential surfaces of the roller bodies are formed of a rubber material to provide a frictional force.

17. The image forming apparatus as claimed in claim 13, wherein the plurality of the document output rollers comprise two document output rollers that are vertically close to each other.

18. The image forming apparatus as claimed in claim 13, wherein a drive gear to receive a driving force is provided at one side of each of the document output rollers and a gear is interposed between the drive gear disposed on each of the document output rollers that are adjacent to one another.

19. The image forming apparatus as claimed in claim 13, wherein the scanner further comprises:
an external guide provided adjacent to the plurality of document output rollers to guide the change of the direction and along which the read one or more documents proceed.

20. The image forming apparatus as claimed in claim 13, wherein the scanner further comprises:
a pinch roller contacting an uppermost one of the plurality of document output rollers to guide the read one or more documents to be output in a direction that is inclined downwardly.

21. The image forming apparatus as claimed in claim 13, wherein the horizontal length of the sunken surface is less than or equal to ¼ of a length of the output one or more documents.

22. The image forming apparatus as claimed in claim 13, wherein the document output plate further comprises:
a stopper provided at an end portion of the document support surface to prevent the output one or more documents from falling off the document support surface.

23. The image forming apparatus as claimed in claim 13, further comprising:
an ADF roller located lower than a height of the document feed plate; and
a friction pad located between the document output plate and the document feed plate and facing the ADF roller to supply the one or more documents stacked on the document feed plate sheet by sheet toward the image sensor.

24. The image forming apparatus as claimed in claim 13, further comprising:
a pickup roller located lower than the height of the document feed plate; and
a tension sheet located between the document feed plate and the document output plate to face the pickup roller, to pickup the one or more documents stacked on the document feed plate, and to supply the one or more documents to the ADF roller.

25. A scanner usable in a multifunctional image forming apparatus, the scanner comprising:
a document feed plate at which one or more documents to be scanned are input;
a document output plate disposed above the document feed plate to which the one or more scanned documents are output; and
one or more rollers to transfer the one or more documents to be scanned along a scan path from the document feed plate to the document output plate, wherein the one or more rollers transfer a first scanned document to the document output plate and then transfer a second scanned document between the document output plate and the first scanned document.

26. The scanner as claimed in claim 25, wherein the one or more rollers transfer the one or more documents at the document feed plate one by one beginning with a lowermost document.

27. The scanner as claimed in claim 25, further comprising:
a transparent window through which a scanning operation is performed disposed adjacent to the document feed plate.

28. The scanner as claimed in claim 27, further comprising:
an external guide having a C-shape to guide the one or more scanned documents upward such that the one or more scanned documents are inverted thereby.

29. The scanner as claimed in claim 25, wherein the document output plate has a non-planar shape including:
a first portion at which leading ends of the one or more scanned documents are supported;
a second portion disposed at a position that is lower than the first portion and is adjacent to the one or more rollers; and
an inclined portion disposed between the first and second portions such that trailing ends of the one or more scanned documents project from the first portion and are suspended above the inclined and second portions.

30. The scanner as claimed in claim 25, wherein the scan path comprise a reverse C-shaped path.

31. A scanner usable with a multifunctional image forming apparatus, the scanner comprising:
a document outlet; and
a document output plate having a non-planar shape, including:
a distal portion at which leading ends of one or more scanned documents are supported, a proximal portion disposed at a position that is lower than the distal portion and is adjacent to the one or more rollers, and
an inclined portion disposed between the distal and proximal portions such that trailing ends of the one or more scanned documents project from the distal portion and are suspended above the inclined and proximal portions.

* * * * *